Patented Sept. 6, 1938

2,129,464

UNITED STATES PATENT OFFICE 2,129,464

RECOVERY OF SODIUM CHLORIDE AND SODIUM CHLORITE FROM AQUEOUS SOLUTIONS

George Lewis Cunningham, Niagara Falls, N. Y., assignor to The Mathieson Alkali Works, Inc., New York, N. Y., a corporation of Virginia No Drawing. Application October 6, 1937,
Serial No. 167,540

3 Claims. (Cl. 23—85)

This invention relates to improvements in the separation and recovery of sodium chlorite, $NaClO_2$, and sodium chloride, $NaCl$, from aqueous solutions containing both of these salts. This invention provides a process of alternate precipitation of sodium chloride and sodium chlorite from such solutions enabling effective and efficient separate recovery of the two salts.

When chlorine dioxide is absorbed by aqueous caustic soda, a mixture of sodium chlorate, $NaClO_3$, and sodium chlorite is formed, as follows:

$$2ClO_2 + 2NaOH - NaClO_3 + NaClO_2 + H_2O.$$

For the production of sodium chlorite, this reaction has been modified by carrying it out in the presence of a reducing agent to avoid the production of sodium chlorate, for example as follows:

$$4ClO_2 + 4NaOH + C - 4NaClO_2 + 2H_2O + CO_2$$

The reduction involved in such modification of the first reaction, however, if carried to the point of eliminating production of sodium chlorate, usually involves the production of some sodium chloride as well as sodium chlorite and, as a consequence, the aqueous solution produced includes sodium chloride as well as sodium chlorite.

The process of this invention is useful, particularly, in the separation and recovery of sodium chlorite and sodium chloride from such solutions. It is, however, generally useful in the separation and recovery of these salts from aqueous solutions containing both salts.

The process of this invention is applicable to aqueous solutions of sodium chloride and sodium chlorite for which the molar ratio $NaCl:NaClO_2$ does not exceed about 1:1. In carrying out the process of the invention, as applied to such solutions, the solution containing both salts is concentrated by evaporation to a point short of but approaching saturation with respect to sodium chloride, sodium chlorite trihydrate, $$NaClO_2.3H_2O,$$

is precipitated by cooling this concentrated solution to a temperature not exceeding 30° C. and precipitated sodium chlorite trihydrate is separated from the solution, the remaining solution is further concentrated by further evaporation to a point short of that at which precipitation of sodium chlorite trihydrate begins and sodium chloride is precipitated from this further concentrated solution by cooling it to a temperature above that to which it was cooled to precipitate sodium chlorite trihydrate and above that at which sodium chlorite trihydrate begins to precipitate, and precipitated sodium chloride is separated from the solution. The remaining solution may with advantage be combined with fresh solution to be subjected to the process and the operation thus made cyclic. As applied to aqueous solutions of these two salts for which the molar ratio $NaCl:NaClO_2$ substantially exceeds 1:1, sodium chloride is first separated, by cooling to a temperature above that at which sodium chlorite trihydrate begins to precipitate after appropriate concentration by evaporation, to bring this molar ratio to an appropriate lower value and the process of this invention then applied to the resulting solution.

After the aqueous solution containing both salts is initially concentrated to a point approximating saturation with respect to sodium chloride, it may be cooled to temperatures ranging from 30° C. down to the freezing point of the solution to effect precipitation and separation of sodium chlorite trihydrate. The lower the temperature within this range, the higher the recovery of sodium chlorite trihydrate. The precipitation and separation of sodium chlorite trihydrate is with advantage effected at a temperature approximating 5° C., and when the sodium chlorite trihydrate precipitation and separation is effected at a temperature approximating 5° C. the precipitation and separation of sodium chloride is to be effected at a temperature not less than 30° C. The successive evaporations may be effected under atmospheric pressure or under somewhat higher pressures or under sub-atmospheric pressures, but the first evaporation is effected at a temperature above that at which sodium chloride precipitates at the prevailing concentration and the second at a temperature above that at which sodium chlorite trihydrate precipitates at the prevailing concentration.

The precipitation and separation of sodium chlorite trihydrate can be effected at temperatures ranging from 30° C. down to the freezing temperature of the solution. Better recoveries of sodium chlorite trihydrate are obtained at lower temperatures within this range.

The invention will be further illustrated by the following example of a cyclic operation embodying the invention: To a liquor containing 51.66 parts (by weight) $NaClO_2$, 8.0 parts $NaCl$ and 68.21 parts $H_2O$ is added a liquor containing 16.47 parts $NaClO_2$, 2.4 parts $NaCl$ and 22.05 parts $H_2O$. 14.9 parts $H_2O$ is evaporated from this combined liquor and the liquor is then cooled to 5° C. 82.5 parts $NaClO_2.3H_2O$ are separated by filtration or in any suitable manner. 22.7 parts $H_2O$ are now evaporated from this mother liquor and the liquor is then cooled to 30° C. 8.0 parts NaCl is separated by filtration or in any suitable manner. The mother liquor now contains 16.47 parts $NaClO_2$, 2.4 parts NaCl and 22.05 parts $H_2O$ and is returned to the first step of the operation.

I claim:

1. In the separate recovery of sodium chlorite and sodium chloride from aqueous solutions containing both salts, the molar ratio $NaCl:NaClO_2$ of the solution not exceeding about 1:1, the improvement which comprises concentrating the solution by evaporation to a point short of but approaching saturation with respect to sodium chloride, precipitating sodium chlorite trihydrate by cooling this concentrated solution to a temperature not exceeding 30° C. and separating precipitated sodium chlorite trihydrate, further concentrating the remaining solution by further evaporation and precipitating sodium chloride by cooling this further concentrated solution to a temperature above that to which it was cooled to precipitate sodium chlorite trihydrate and above that at which sodium chlorite trihydrate begins to precipitate, and separating precipitated sodium chloride.

2. In the separate recovery of sodium chlorite and sodium chloride from aqueous solutions containing both salts, the molar ratio $NaCl:NaClO_2$ of the solution not exceeding about 1:1, the improvement which comprises concentrating the solution by evaporation to a point short of but approaching saturation with respect to sodium chloride, precipitating sodium chlorite trihydrate by cooling this concentrated solution to a temperature approximating 5° C. and separating precipitated sodium chlorite trihydrate, further concentrating the remaining solution by further evaporation and precipitating sodium chloride by cooling this further concentrated solution to a temperature not less than 30° C., and separating precipitated sodium chloride.

3. In the separate recovery of sodium chlorite and sodium chloride from aqueous solutions containing both salts, the molar ratio $NaCl:NaClO_2$ of the solution not exceeding about 1:1, the improvement which comprises concentrating the solution by evaporation to a point short of but approaching saturation with respect to sodium chloride, precipitating sodium chlorite trihydrate by cooling this concentrated solution to a temperature not exceeding 30° C. and separating precipitated sodium chlorite trihydrate, further concentrating the remaining solution by further evaporation and precipitating sodium chloride by cooling this further concentrated solution to a temperature above that to which it was cooled to precipitate sodium chlorite trihydrate and above that at which sodium chlorite trihydrate begins to precipitate, and separating precipitated sodium chloride, combining the remaining solution with fresh solution, the molar ratio $NaCl:NaClO_2$ of the solution not exceeding about 1:1, and repeating the operation thereon.

GEORGE LEWIS CUNNINGHAM.